(12) United States Patent
Koumura

(10) Patent No.: US 8,579,312 B2
(45) Date of Patent: Nov. 12, 2013

(54) ATTACHMENT STRUCTURE OF STABILIZER LINK

(75) Inventor: Shingo Koumura, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 152 days.

(21) Appl. No.: 13/201,396

(22) PCT Filed: Feb. 8, 2010

(86) PCT No.: PCT/JP2010/052127
§ 371 (c)(1), (2), (4) Date: Aug. 12, 2011

(87) PCT Pub. No.: WO2010/093029
PCT Pub. Date: Aug. 19, 2010

(65) Prior Publication Data
US 2011/0291378 A1    Dec. 1, 2011

(30) Foreign Application Priority Data
Feb. 12, 2009    (JP) ................................. 2009-029523

(51) Int. Cl.
*B60G 21/055*    (2006.01)
*B60G 3/00*    (2006.01)

(52) U.S. Cl.
USPC ...... 280/124.152; 280/124.107; 280/124.146; 280/124.15

(58) Field of Classification Search
USPC ...................... 280/124.146, 124.148, 124.15, 280/124.152, 124.106, 124.107
See application file for complete search history.

(56) References Cited

U.S. PATENT DOCUMENTS

| | | | |
|---|---|---|---|
| 8,220,807 B2 * | 7/2012 | Lorenzon et al. | 280/124.106 |
| 8,240,688 B2 * | 8/2012 | Miyamoto | 280/124.107 |
| 2009/0160155 A1 * | 6/2009 | Shimatami et al. | 280/124.152 |

FOREIGN PATENT DOCUMENTS

| | | |
|---|---|---|
| JP | 02-241812 A | 9/1990 |
| JP | 09-002042 A | 1/1997 |
| JP | 2003-112511 A | 4/2003 |
| JP | 2006-143013 A | 6/2006 |
| JP | 2006-175913 A | 7/2006 |
| JP | 2006-182175 A | 7/2006 |
| JP | 2006-321296 A | 11/2006 |
| JP | 2009-227004 A | 10/2009 |
| WO | 2009/115873 A1 | 9/2009 |

* cited by examiner

*Primary Examiner* — Ruth Ilan
(74) *Attorney, Agent, or Firm* — Sughrue Mion, PLLC

(57) ABSTRACT

An attachment structure of a stabilizer link is provided having one end pivotally fitted to an end of a stabilizer and the other end coupled to a wheel support member by a coupling device. A positional relationship of pivot points of the one end and the other end of the stabilizer link relative to the kingpin axis is set such that when the stabilizer link is displaced relative to the wheel support member in accordance with rolling of a vehicle at the time of turning, the wheel support member is pivotally displaced about the kingpin axis in the direction where a steered angle of the steered wheel is increased, and when a magnitude of roll angle of the vehicle is large, the coupling device increases a ratio of a pivotal displacement amount of the wheel support member relative to the roll angle of the vehicle as compared with a situation where a magnitude of roll angle of the vehicle is small.

7 Claims, 5 Drawing Sheets

ATTACHMENT STRUCTURE OF STABILIZER LINK

CROSS REFERENCE TO RELATED APPLICATIONS

This application is a National Stage of International Application No. PCT/JP2010/052127filed Feb. 8, 2010, claiming priority based on Japanese Patent Application No. 2009-029523filed Feb. 12, 2009, the contents of all of which are incorporated herein by reference in their entirety.

TECHNICAL FIELD

The present invention relates to a stabilizer of a vehicle such as an automobile, and more particularly, to an attachment structure of a stabilizer link having one end pivotally fitted to an end of the stabilizer and the other end coupled to a wheel support member.

RELATED ART

In a vehicle such as an automobile, a stabilizer for ensuring running stability of the vehicle at the time of turning is built. The stabilizer has a torsion bar part extending in the lateral direction of the vehicle, and a pair of arm portions integrated with ends of the torsion bar part, the arm portions extending inclined in the vehicle front and back direction relative to the torsion bar part. An end of each arm portion is coupled to a wheel carrier or a shock absorber by a stabilizer link. Each stabilizer link has one end pivotally fitted to the end of the arm portion of the stabilizer, and the other end pivotally fitted to the wheel carrier or the shock absorber.

As one of attachment structures of stabilizer link, there is a known attachment structure, in which a stabilizer link is arranged so that the stabilizer link and a kingpin axis define skew lines; roll restoring force of the stabilizer is small in a region where a twist angle of the stabilizer by bound or rebound of wheels is small; and the roll restoring force of the stabilizer is increased in accordance with an increase in the twist angle in a region where the twist angle of the stabilizer is large. For example, reference may be made to Japanese Patent Application Laid-Open (kokai) No. 2003-112511. According to this type of attachment structure of stabilizer link, necessary steering force when a wheel is in the vicinity of a neutral position between bound and rebound can be reduced.

SUMMARY OF THE INVENTION

In general, there is a problem that, in a vehicle such as an automobile, in a region where a steering angle is large in magnitude, due to non-linear characteristic of a tire or the like, a ratio of turning lateral force of a vehicle relative to the steering angle is small, and thus turning lateral acceleration of the vehicle becomes disproportional to the steering angle. According to the attachment structure of stabilizer link as described above, when the steering angle is increased and a roll angle of a vehicle is increased, the twist angle of the stabilizer is increased and thus the roll restoring force of the stabilizer is increased. However, in the region where the steering angle is large in magnitude, the ratio of the turning lateral force of the vehicle relative to the steering angle cannot be increased. Therefore, there still remains the problem that the turning lateral acceleration of the vehicle is disproportional to the steering angle in the region where the steering angle is large in magnitude.

A major object of the preset invention is to ease the problem that the turning lateral acceleration of a vehicle is disproportional to the steering angle in the region where the steering angle is large in magnitude by improving the attachment structure of stabilizer link.

The present invention provides, in a vehicle provided with a wheel support member rotatably supporting a steered wheel, the wheel support member being pivotable about a kingpin axis together with the steered wheel, an attachment structure of a stabilizer link pivotally fitted at one end to an end of a stabilizer and coupled at the other end to the wheel support member by a coupling means, wherein a positional relationship of pivot points of the one end and the other end of the stabilizer link relative to the kingpin axis is set such that when the stabilizer link is displaced relative to the wheel support member in accordance with rolling of the vehicle at the time of turning, the wheel support member is pivotally displaced about the kingpin axis in the direction where a steered angle of the steered wheel is increased, and the coupling means is configured to increase a ratio of a pivotal displacement amount of the wheel support member relative to the roll angle of the vehicle when the magnitude of roll angle of the vehicle is large, as compared with a situation where the magnitude of roll angle of the vehicle is small.

With this configuration, the positional relationship of the pivot points of the one end and the other end of the stabilizer link relative to the kingpin axis is set such that when the stabilizer link is displaced relative to the wheel support member in accordance with the rolling of the vehicle at the time of the turning, the wheel support member is pivotally displaced about the kingpin axis in the direction where the steered angle of the steered wheel is increased. When the roll angle of the vehicle is large, the coupling means increases the ratio of the pivotal displacement amount of the wheel support member relative to the roll angle of the vehicle as compared with a situation where the roll angle of the vehicle is small.

Therefore, when the steering angle is large in magnitude and the roll angle of the vehicle is increased, the ratio of the pivotal displacement amount of the wheel support member relative to the roll angle of the vehicle is increased. Thereby, the pivotal displacement amount of the wheel support member is increased, resulting in that the wheel support member is pivoted about the kingpin axis in the direction where the steered angle of the steered wheel is increased. Therefore, the turning lateral force is increased by an increase in the steered angle of the steered wheel, which enables to ease the problem that the turning lateral acceleration of the vehicle becomes disproportional to the steering angle due to the fact that the ratio of the turning lateral force of the vehicle relative to the steering angle is decreased in the region where the steering angle is large in magnitude.

In the above configuration, the stabilizer link may be pivotally fitted at a lower end to the end of the stabilizer and coupled at an upper end to the wheel support member by the coupling means, and when viewing pivotal motion of the steered wheel about the kingpin axis in the toe-in direction, the lower end may be positioned on the trailing side in the pivoting direction relative to the upper end.

With this configuration, when the stabilizer link is displaced upward in accordance with bound of the steered wheel on the turning outer wheel side, the upper end is displaced about the kingpin axis in the toe-in direction of the steered wheel relative to the lower end. While on the other hand, when the stabilizer link is displaced downward in accordance with rebound of the steered wheel on the turning inner wheel side, the upper end is displaced about the kingpin axis in the toe-out direction of the steered wheel relative to the lower end. Therefore, both on the turning outer wheel side and on the turning inner wheel side, the wheel support member can be pivoted about the kingpin axis in the direction where the steered angle of the steered wheel is increased, and when the magnitude of roll angle of the vehicle is large, an increase rate of a pivotal displacement amount of the wheel support member can be increased as compared with a situation where the magnitude of roll angle of the vehicle is small.

In the above configuration, the coupling means may be configured to increase the ratio of the pivotal displacement amount of the wheel support member relative to the magnitude of roll angle of the vehicle when the magnitude of roll angle of the vehicle becomes a reference value or more.

With this configuration, when the magnitude of roll angle of the vehicle becomes the reference value or more, the ratio of the pivotal displacement amount of the wheel support member relative to the magnitude of roll angle of the vehicle is increased. Therefore, in a region where the magnitude of roll angle of the vehicle is below the reference value, unnecessary increase of the ratio of the pivotal displacement amount of the wheel support member relative to the magnitude of roll angle of the vehicle can be prevented. While on the other hand, in a region where the magnitude of roll angle of the vehicle is equal to or more than the reference value, the ratio of the pivotal displacement amount of the wheel support member relative to the magnitude of roll angle of the vehicle can reliably be increased.

In the above configuration, the reference value may be set based on the steered angle of the steered wheel at which a relationship between the steered angle of the steered wheel and turning lateral force of the steered wheel is changed between linear and non-linear relationships.

With this configuration, the reference value is set based on the steered angle of the steered wheel at which the relationship between the steered angle of the steered wheel and the turning lateral force of the steered wheel is changed between the linear and non-linear relationships. Therefore, in a region where the relationship between the steered angle of the steered wheel and the turning lateral force of the steered wheel is linear, unnecessary increase of the ratio of the pivotal displacement amount of the wheel support member relative to the roll angle of the vehicle can be prevented. While on the other hand, in a region where the relationship between the steered angle of the steered wheel and the turning lateral force of the steered wheel is non-linear, the ratio of the pivotal displacement amount of the wheel support member relative to the roll angle of the vehicle can reliably be increased. Thereby, the non-linear relationship between the rudder angle of the steered wheel and the turning lateral force of the steered wheel can be made closer to linear.

In the above configuration, the coupling means may have a rotation member rotated on the wheel support member when the stabilizer link is displaced relative to the wheel support member in accordance with the rolling of the vehicle at the time of the turning, and a pivotal displacement transmission member for transmitting pivotal displacement about the kingpin axis from the rotation member to the wheel support member, and when a relative rotation angle of the rotation member relative to the wheel support member is large, the pivotal displacement transmission member may increase a ratio of the pivotal displacement amount relative to the relative rotation angle as compared with a situation where the relative rotation angle of the rotation member is small.

With this configuration, when the relative rotation angle of the rotation member relative to the wheel support member is large, the ratio of the pivoting displacement amount relative to the relative rotation angle is increased as compared with a situation where the relative rotation angle of the rotation member is small. Therefore, when the relative rotation angle of the rotation member relative to the wheel support member is large, the pivotal displacement amount transmitted from the rotation member to the wheel support member can be increased as compared with a situation where the relative rotation angle of the rotation member is small, which effectively increases the steered angle of the steered wheel.

In the above configuration, the pivotal displacement transmission member may be configured to increase the ratio of the pivotal displacement amount relative to the relative rotation angle when the rotation member is rotated by a reference value or more relative to the wheel support member.

With this configuration, when the rotation member is rotated by the reference value or more relative to the wheel support member, the ratio of the pivotal displacement amount relative to the relative rotation angle is increased. Therefore, in a region where the relative rotation angle of the rotation member relative to the wheel support member is below the reference value, unnecessary increase of the ratio of the pivotal displacement amount of the wheel support member relative to the roll angle of the vehicle can be prevented. While on the other hand, in a region where the relative rotation angle of the rotation member relative to the wheel support member is equal to or more than the reference value, the ratio of the pivotal displacement amount of the wheel support member relative to the roll angle of the vehicle can reliably be increased.

In the above configuration, the pivotal displacement transmission member may include an elastic material which is placed between the rotation member and the wheel support member and serves to transmit the pivotal displacement about the kingpin axis from the rotation member to the wheel support member, and a pressing means for pressing the elastic material so as to increase a spring constant of the elastic material at least in the pivoting direction about the kingpin axis when the rotation member is rotated by the reference value or more relative to the wheel support member.

With this configuration, when the rotation member is rotated by the reference value or more relative to the wheel support member, the spring constant of the elastic material at least in the pivoting direction about the kingpin axis is increased by pressing the elastic material by the pressing means. Therefore, in the region where the relative rotation angle of the rotation member relative to the wheel support member is equal to or more than the reference value, the pivotal displacement amount transmitted from the rotation member to the wheel support member via the elastic material can reliably be increased.

In the above configuration, when the roll angle of the vehicle is equal to or more than the reference value, the coupling means may successively increase the ratio of the pivotal displacement amount relative to the roll angle of the vehicle in accordance with an increase in the roll angle of the vehicle.

In the above configuration, the wheel support member may include a carrier rotatably supporting the steered wheel, and a shock absorber having an upper end pivotally supported on a vehicle body and a lower end coupled to the carrier, and the rotation member may be configured to rotate about the shock absorber.

In the above configuration, the pivotal displacement transmission member may be configured to successively increase the ratio of the pivotal displacement amount relative to the relative rotation angle in accordance with an increase in the relative rotation angle when the rotation member is rotated by the reference value or more relative to the wheel support member.

In the above configuration, the elastic material may be fixed to one of the rotation member and the wheel support member.

In the above configuration, the pressing means may be fixed to the other of the rotation member and the wheel support member.

In the above configuration, the elastic material may be abutted with the other of the rotation member and the wheel support member so as to prevent relative rotation.

MODE FOR CARRYING OUT THE INVENTION

Hereinafter, a preferred embodiment of the present invention will be described in detail with reference to the attached drawings.

Figure 1:
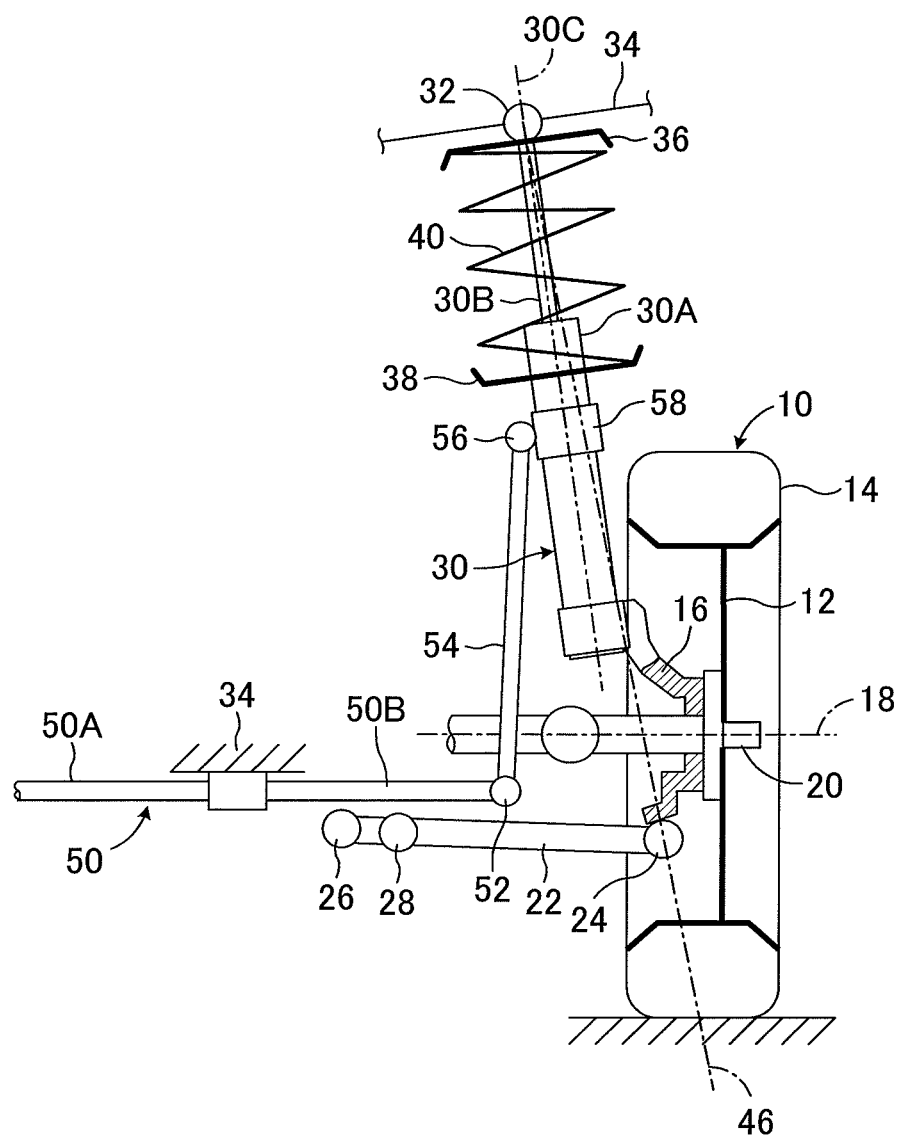
FIG. 1 is a skeleton view showing an embodiment of an attachment structure of a stabilizer link according to the present invention applied to a front-wheel drive vehicle when seen from the rear side of the vehicle.
Figure 2:
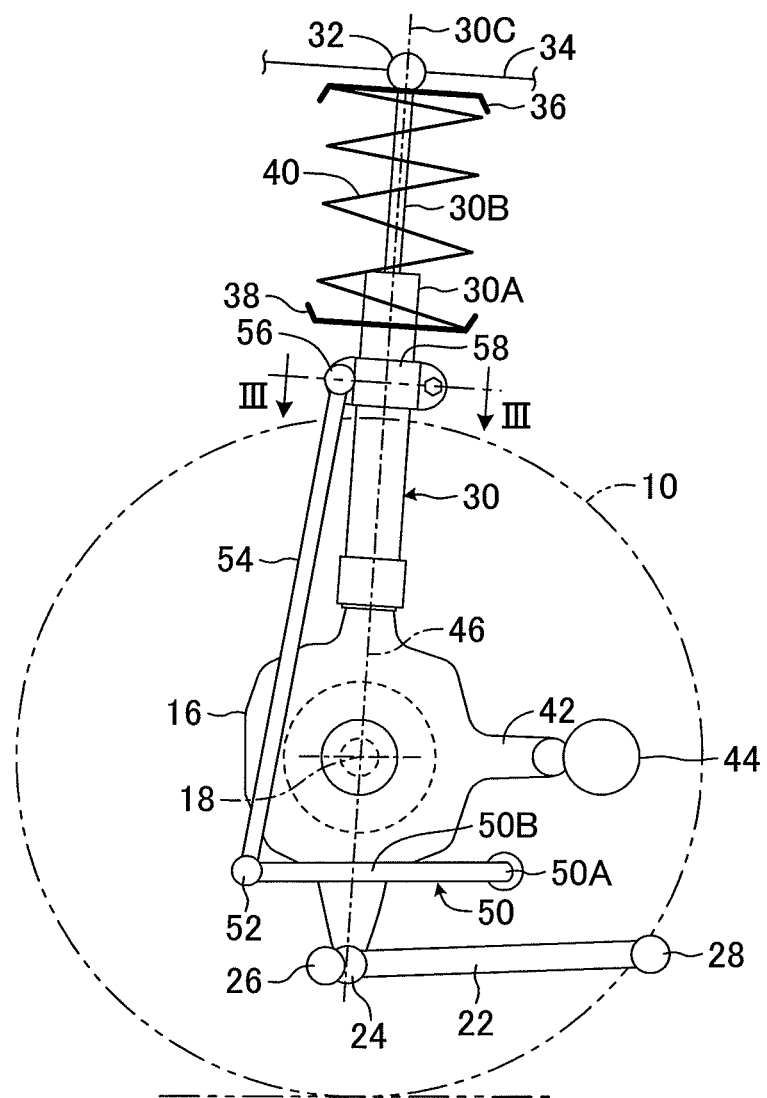
FIG. 2 is a skeleton view showing the embodiment shown in FIG. 1 as seen from the inboard side of the vehicle.
Figure 3:
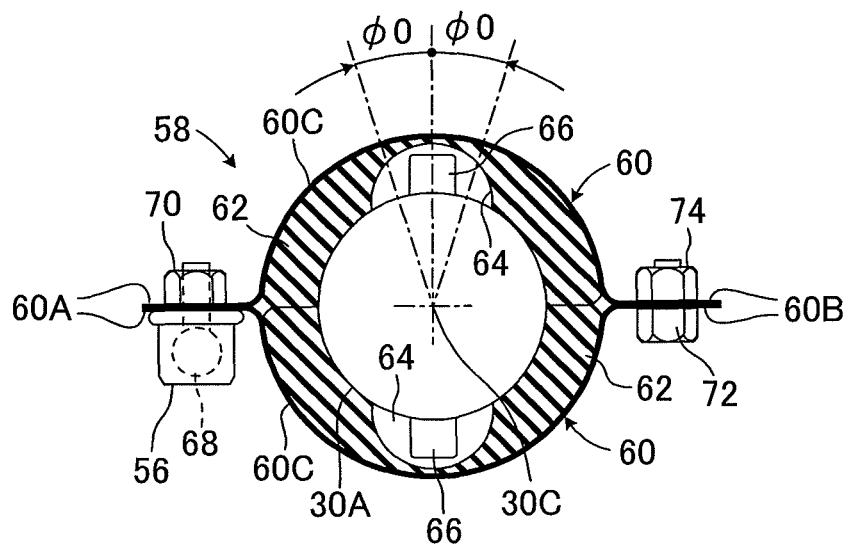
FIG. 3 is an enlarged sectional view taken along the line III-III of FIG. 2.

FIG. 1 is a skeleton view showing an embodiment of an attachment structure of a stabilizer link according to the present invention applied to a front-wheel drive vehicle as seen from the rear side of the vehicle. FIG. 2 is a skeleton view showing the embodiment shown in FIG. 1 as seen from the inboard side of the vehicle. FIG. 3 is an enlarged sectional view taken along the line III-III of FIG. 2.

In these figures, the reference numeral 10 denotes a front wheel of the vehicle serving as a steered wheel as well as a drive wheel. The wheel 10 includes a metal wheel part 12, and a tire 14 made of rubber and the like and installed on an outer periphery of the wheel part 12. The wheel 10 is supported rotatably about a rotation axis 18 by a carrier 16, and is rotationally driven about the rotation axis 18 by a spindle 20.

A lower end of the carrier 16 is pivotally fitted with an outer end of a control arm 22 via a ball joint 24. The control arm 22 of the embodiment shown in the figures is a L-shaped arm having an inner end and a rear end in addition to the outer end. The inner end and the rear end are pivotally supported by brackets of a vehicle body via rubber bushing devices 26, 28, respectively.

An upper end of the carrier 16 is fixedly coupled to a lower end of a cylinder 30A of a shock absorber 30. The shock absorber 30 has a piston rod 30B and its upper end is pivotally fitted to a vehicle body 34 by an upper support 32. A coil spring 40 acting as a suspension spring is elastically installed between an upper spring sheet 36 fixed to the upper support 32 and a lower spring sheet 38 fixed to the cylinder 30A.

A knuckle arm 42 is integrally formed with the carrier 16. An end of the knuckle arm 42 is coupled to a rack bar of a rack-and-pinion type power steering device 44 via a tie rod. A center of a ball part of the ball joint 24 provided in the outer end of the control arm 22 and a center of the upper support 32 cooperate with each other to define a kingpin axis 46. Therefore, the wheel 10 is pivoted about the kingpin axis 46 by the power steering device 44 via the tie rod, and thereby a steered angle is changed.

The carrier 16, the control arm 22, the shock absorber 30, the coil spring 40, and the like cooperate with each other to form a McPherson strut type suspension. The carrier 16 and the shock absorber 30 form a wheel support member which supports the wheel 10 rotatably about the rotation axis 18 and is pivotable about the kingpin axis 46 together with the wheel 10.

In FIGS. 1 and 2, the reference numeral 50 denotes a stabilizer. The stabilizer 50 has a torsion bar part 50A extending in the lateral direction of the vehicle, and a pair of arm portions 50B integrated with ends of the torsion bar part, the arm portions extending inclined in the longitudinal direction of the vehicle relative to the torsion bar part. Particularly in the embodiment shown in the figures, the torsion bar part 50A is positioned on the rear side of the vehicle relative to the rotation axis 18 of the wheel 10, and the pair of arm portions 50B extends forward to the front side of the vehicle relative to the rotation axis 18. Stabilizer links 54 are provided and a lower end of each stabilizer link is pivotally fitted to an end of the associated arm portion 50B via a ball joint 52. An upper end of each stabilizer link 54 is pivotally fitted to a coupling device 58 via a ball joint 56.

As shown in FIGS. 1 and 2, the stabilizer link 54 is positioned on the inboard side of the vehicle relative to the kingpin axis 46. When viewing pivotal motion of the wheel 10 about the kingpin axis 46 in the toe-in direction, a pivot point of the lower end of the stabilizer link 54, that is, a center of the ball joint 52, is positioned on the trailing side in the pivoting direction relative to a pivot point of the upper end of the stabilizer link 54, that is, a center of the ball joint 56. Particularly, the center of the ball joint 52 is positioned on the front, inboard and lower side of the vehicle relative to the center of the ball joint 56.

As shown in FIG. 3, the coupling device 58 has a pair of metal bracket members 60. Each of the bracket members 60 includes a pair of bracket portions 60A, 60B spaced from each other, and a semi-cylinder portion 60C integrally provided between the pair of bracket portions. The pair of bracket members 60 are arranged so as to face each other with the semi-cylinder portions 60C substantially concentrically surrounding the cylinder 30A of the shock absorber 30.

A semi-cylindrical rubber body 62 is fixed to an inner surface of each of the semi-cylinder portions 60C by means of adhesion or the like, and the rubber body 62 has an inner diameter slightly smaller than an outer diameter of the cylinder 30A. A hollow portion 64 opened radially inward is provided on the inner surface of each rubber body 62 in a center in the width direction, and the hollow portion 64 has a substantially semi-elliptical cross section. A pair of columnar stoppers 66 made of a hard material is fixed to an outer surface of the cylinder 30A by means of the adhesion or the like. Each of the stoppers 66 is positioned at a center in the width direction of the associated hollow portion 64 and is spaced from the associated rubber body 62 in the circumferential direction when the wheel 10 is at a neutral position between bound and rebound.

The pair of bracket portions 60A is fastened to each other by a ball member 68 of the ball joint 56 and a nut 70 screwed onto a screw portion of the ball member, and the pair of bracket portions 60B is fastened to each other by a bolt 72 and a nut 74. Therefore, inner surfaces of the rubber bodies 62 are abutted with the cylinder 30A of the shock absorber 30 so as not to be displaced relative to the cylinder 30A. The pair of bracket members 60 is rotatable about an axis 30C of the shock absorber 30 relative to the cylinder 30A but is not displaced relative to the cylinder 30A along the axis 30C.

Figure 4:
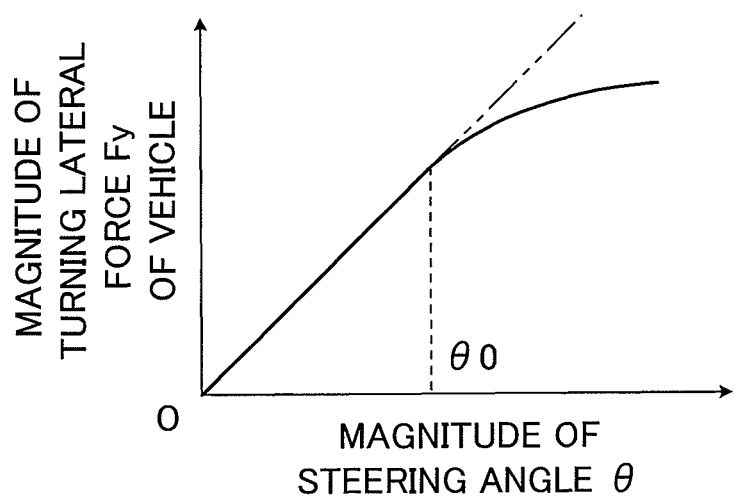
FIG. 4 is a graph showing a relationship between a magnitude of steering angle θ and a magnitude of turning lateral force Fy of the vehicle.
Figure 5:
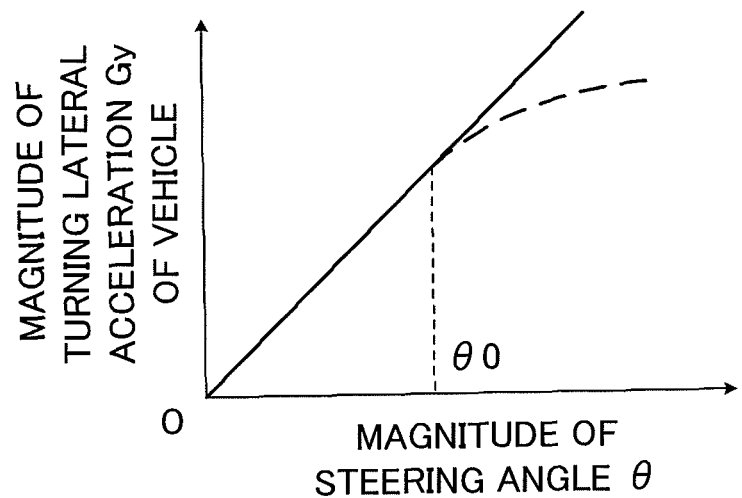
FIG. 5 is a graph showing a relationship between a magnitude of steering angle θ and a magnitude of turning lateral acceleration Gy of the vehicle.

As shown in FIG. 4, a relationship of a magnitude of turning lateral force Fy of the vehicle to a magnitude of steering angle $\theta$ is linear in a region where the magnitude of steering angle $\theta$ is small. However, in a region where the magnitude of steering angle $\theta$ is large, a ratio of the magnitude of turning lateral force Fy of the vehicle relative to the magnitude of steering angle $\theta$ is decreased due to non-linear characteristic of a tire or the like. Thus, the above relationship is non-linear. Therefore, in a vehicle in which the attachment structure of a stabilizer link according to the present invention is not built, turning lateral acceleration Gy of the vehicle is proportional to the steering angle $\theta$ in a region where the magnitude of steering angle $\theta$ is smaller than a reference value $\theta 0$ for example, but, as shown by a broken line in FIG. 5, the turning lateral acceleration Gy of the vehicle becomes disproportional to the steering angle $\theta$ in a region where the magnitude of steering angle $\theta$ is equal to or more than the reference value $\theta 0$.

In general, when the roll angle of the vehicle is increased due to turning and a twist angle of the torsion bar part 50A of the stabilizer 50 is increased, the stabilizer link 54 is biased upward relative to the shock absorber 30 by reaction force of the stabilizer 50 generated along with the bound of the wheel 10 on the turning outer wheel side. Conversely, the stabilizer link 54 is biased downward relative to the shock absorber 30 by reaction force of the stabilizer 50 generated along with the rebound of the wheel 10 on the turning inner wheel side.

In the embodiment shown in the figures, the shock absorber 30 is supported so that it can pivot about the kingpin axis 46 together with the carrier 16. As described above, when viewing the pivotal motion of the wheel 10 about the kingpin axis 46 in the toe-in direction, the pivot point of the lower end of the stabilizer link 54 is positioned on the trailing side in the pivoting direction relative to the pivot point of the upper end of the stabilizer link 54. Therefore, on the turning outer wheel side, since the stabilizer link 54 is biased upward, the upper end of the stabilizer link 54 and the pair of bracket members 60 are rotationally driven relative to the cylinder 30A, and pivotal displacement of the wheel 10 about the kingpin axis 46 in the toe-in direction is transmitted from the pair of bracket members 60 to the cylinder 30A via the rubber bodies 62.

Similarly, on the turning inner wheel side, since the stabilizer link 54 is biased downward, the upper end of the stabilizer link 54 and the pair of bracket members 60 are rotationally driven relative to the cylinder 30A, and pivotal displacement of the wheel 10 about the kingpin axis 46 in the toe-out direction is transmitted from the pair of bracket members 60 to the cylinder 30A via the rubber bodies 62.

Therefore, when the pair of bracket members 60 is driven by the stabilizer link 54, the rubber bodies 62 are shear deformed elastically in the circumferential direction along with rotation of the pair of bracket members 60, and act as elastic materials for transmitting the pivotal displacement about the kingpin axis 46 from the pair of bracket members 60 to the shock absorber 30 and the carrier 16.

As described above, when the wheel 10 is at the neutral position between bound and rebound, the stoppers 66 are spaced from the rubber bodies 62 in the circumferential direction. Therefore, when a roll angle $\alpha$ of the vehicle is small and a relative rotation angle $\phi$ of the pair of bracket members 60 relative to the cylinder 30A is below a reference value $\phi 0$, the stoppers 66 are not abutted with the rubber bodies 62.

Meanwhile, when the magnitude of steering angle $\theta$ is increased and the roll angle $\alpha$ of the vehicle is increased corresponding thereto, resulting in that the relative rotation angle $\phi$ of the pair of bracket members 60 relative to the cylinder 30A becomes the reference value $\phi 0$ or more, the stoppers 66 press and compressively deform the rubber bodies 62. Therefore, a spring constant of the rubber bodies 62 at least in the pivoting direction about the kingpin axis 46 is increased, and an increase rate of this spring constant is increased in accordance with an increase in the magnitude of relative rotation angle $\phi$.

Figure 6:
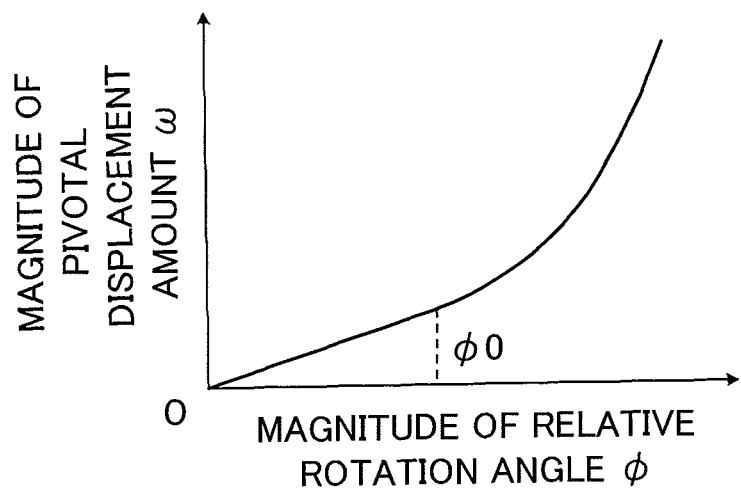
FIG. 6 is a graph showing a relationship between a magnitude of relative rotation angle φ and a magnitude of pivotal displacement amount ω of a shock absorber and a carrier.
Figure 7:
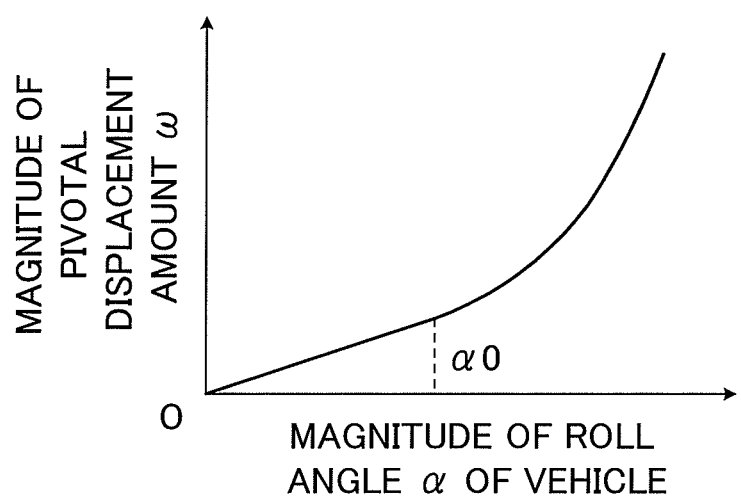
FIG. 7 is a graph showing a relationship between a magnitude of roll angle α of the vehicle and a magnitude of pivotal displacement amount ω of the shock absorber and the carrier.

Therefore, as shown in FIG. 6, when the magnitude of relative rotation angle $\phi$ becomes the reference value $\phi 0$ or more, an increase rate of a pivotal displacement amount $\omega$ of the shock absorber 30 and the carrier 16 about the kingpin axis 46 is increased, and the increase rate of the pivotal displacement amount $\omega$ is increased in accordance with the increase in the magnitude of relative rotation angle $\phi$. Thus, as shown in FIG. 7, a ratio of the pivotal displacement amount $\omega$ relative to the roll angle $\alpha$ of the vehicle is also increased when the roll angle $\alpha$ of the vehicle becomes a reference value $\alpha 0$ corresponding to the reference value $\phi 0$ or more. An increase rate of the ratio of the pivotal displacement amount $\omega$ relative to the roll angle $\alpha$ of the vehicle is also increased in accordance with an increase in the magnitude of roll angle $\alpha$ of the vehicle.

Therefore, when the magnitude of roll angle $\alpha$ of the vehicle is equal to or more than the reference value $\alpha 0$, the steered angle of the wheel 10 is increased and cornering force of the wheel 10 is increased as compared with the situation where the magnitude of roll angle $\alpha$ of the vehicle is below the reference value $\alpha 0$. When the magnitude of roll angle $\alpha$ of the vehicle is equal to or more than the reference value $\alpha 0$, an increase rate of the cornering force is increased in accordance with the increase in the magnitude of roll angle $\alpha$ of the vehicle.

According to the embodiment shown in the figures, the turning lateral force lowered due to the non-linear characteristic of a tire or the like in the region where the magnitude of steering angle $\theta$ is large can be supplemented by an increase in the cornering force. Thus, as shown by a solid line in FIG. 5, the ratio of the magnitude of turning lateral force Fy of the vehicle relative to the magnitude of steering angle $\theta$ can be suppressed from being decreased in the region where the magnitude of steering angle $\theta$ is large, and the relationship of the magnitude of turning lateral force Fy of the vehicle to the magnitude of steering angle $\theta$ can be made closer to linear.

Particularly in the embodiment shown in the figures, the reference value $\phi 0$ of the relative rotation angle $\phi$, that is, a gap in the circumferential direction between the rubber bodies 62 and the stoppers 66 at the time of no rolling of the vehicle, is set to a value which the relative rotation angle $\phi$ assumes when vehicle speed is a preliminarily set standard vehicle speed and the magnitude of steering angle $\theta$ is the reference value $\theta 0$. In other words, the reference value $\phi 0$ of the relative rotation angle $\phi$ and the reference value $\alpha 0$ of the roll angle $\alpha$ of the vehicle are set to values corresponding to the steering angle $\theta$, that is, the steering angle $\theta 0$ at which the relationship between the steered angle of the wheel 10 and the turning lateral force Fy of the wheel is changed between linear and non-linear relationships under a situation where the vehicle speed is a standard vehicle speed.

Therefore, in a region where the relationship between the steered angle of the steered wheel and the turning lateral force Fy of the steered wheel, that is, the relationship between the steering angle θ and the turning lateral force Fy of the steered wheel, is linear, unnecessary increase of the ratio of the pivotal displacement amount ω of the wheel support member relative to the magnitude of roll angle α of the vehicle can be prevented. While on the other hand, in a region where the relationship between the steering angle θ and the turning lateral force Fy of the steered wheel is non-linear, the ratio of the pivotal displacement amount ω of the wheel support member relative to the magnitude of roll angle α of the vehicle can be increased. Thereby, the non-linear relationship between the steering angle θ and the turning lateral force Fy of the steered wheel can be effectively made closer to linear.

It is to be noted that even in the case where the stabilizer link 54 is displaced relative to the cylinder 30A by bound and rebound of the wheel 10 due to unevenness of a road surface, the pair of bracket members 60 is rotated relative to the cylinder 30A. However, since the relative rotation angle ϕ in that case is small, the pivotal displacement amount ω of the shock absorber 30 and the carrier 16 about the kingpin axis 46 is also small. Thus, straight running stability of the vehicle is not deteriorated.

Particularly, according to the embodiment shown in the figures, the pair of bracket members 60 of the coupling device 58 is supported rotatably relative to the cylinder 30A via the pair of semi-cylindrical rubber bodies 62. Therefore, the upper end of the stabilizer link 54 can be coupled to the shock absorber 30 without substantially changing a design of the shock absorber.

While the present invention has been described in detail with reference to the above particular embodiment, it will be apparent to those skilled in the art that the present invention is not limited thereto, but may be embodied in various other forms without departing from the scope of the invention.

For example, in the coupling device 58 of the above embodiment, the rubber bodies 62 are fixed to inner surfaces of the bracket members 60 and the stoppers 66 are fixed to the outer surface of the cylinder 30A. However, the rubber bodies 62 may be fixed to the outer surface of the cylinder 30A and the stoppers 66 may be fixed to the inner surfaces of the bracket members 60.

In the above embodiment, the torsion bar part 50A of the stabilizer 50 is positioned on the rear side of the vehicle relative to the rotation axis 18 of the wheel 10, and the ends of the pair of arm portions 50B are positioned on the front side of the vehicle relative to the rotation axis 18. However, the torsion bar part 50A may be positioned on the front side of the vehicle relative to the rotation axis 18, and the ends of the pair of arm portions 50B may be positioned on the rear side of the vehicle relative to the rotation axis 18.

In the above embodiment, the suspension is the McPherson strut type suspension. However, the suspension may be a double wishbone type suspension for example. In that case, the coupling device 58 may couple the upper end of the stabilizer link 54 to the carrier 16 so that the upper end is rotatable relative to the carrier 16.

In the above embodiment, the lower end of each stabilizer link 54 is pivotally fitted to the end of the associated arm portion 50B of the stabilizer 50. However, the upper end of the stabilizer link 54 may be pivotally fitted to the end of the arm portion 50B of the stabilizer 50, and the lower end of the stabilizer 54 may be coupled to the wheel support member. In that case, when viewing the pivotal motion of the wheel 10 about the kingpin axis 46 in the toe-in direction, positions of the two pivot points are set so that the pivot point of the upper end of the stabilizer link 54 is positioned on the leading side in the pivoting direction relative to the pivot point of the lower end.

In the above embodiment, the wheel 10 serves as the steered wheel as well as the drive wheel. However, the wheel may be the steered wheel as well as a driven wheel.

The invention claimed is:

1. In a vehicle provided with a wheel support member rotatably supporting a steered wheel, the wheel support member being pivotable about a kingpin axis together with the steered wheel, an attachment structure of a stabilizer link pivotally fitted at one end to an end of a stabilizer and coupled at the other end to the wheel support member by a coupling device, wherein
    a positional relationship of pivot points of the one end and the other end of the stabilizer link relative to the kingpin axis is set such that when the stabilizer link is displaced relative to the wheel support member in accordance with rolling of the vehicle at the time of turning, the wheel support member is pivotally displaced about the kingpin axis in the direction where a steered angle of the steered wheel is increased, and
    the coupling device is configured to increase a ratio of a pivotal displacement amount of the wheel support member relative to the roll angle of the vehicle as a magnitude of roll angle of the vehicle is increased.

2. An attachment structure of a stabilizer link according to claim 1, wherein
    the stabilizer link is pivotally fitted at a lower end to the end of the stabilizer and coupled at an upper end to the wheel support member by the coupling device, and
    when the steered wheel is moved pivotally about the kingpin axis in the toe-in direction, the lower end is positioned on the trailing side relative to the upper end.

3. An attachment structure of a stabilizer link according to claim 1, wherein
    the coupling device increases the ratio of the pivotal displacement amount of the wheel support member relative to the magnitude of roll angle of the vehicle when the magnitude of roll angle of the vehicle becomes a reference value or more.

4. An attachment structure of a stabilizer link according to claim 3, wherein
    the reference value is set based on the steered angle of the steered wheel at which a relationship between the steered angle of the steered wheel and turning lateral force of the steered wheel is changed between linear and non-linear relationships.

5. An attachment structure of a stabilizer link according to claim 1, wherein
    the coupling device has a rotation member rotated on the wheel support member when the stabilizer link is displaced relative to the wheel support member in accordance with the rolling of the vehicle at the time of the turning, and a pivotal displacement transmission member for transmitting pivotal displacement about the kingpin axis from the rotation member to the wheel support member, and
    as a relative rotation angle of the rotation member relative to the wheel support member is increased, the pivotal displacement transmission member increases a ratio of the pivotal displacement amount relative to the relative rotation angle.

6. An attachment structure of a stabilizer link according to claim 5, wherein the pivotal displacement transmission member increases the ratio of the pivotal displacement amount relative to the relative rotation angle when the rotation member is rotated by a reference value or more relative to the wheel support member.

7. An attachment structure of a stabilizer link according to claim 6, wherein
the pivotal displacement transmission member includes an elastic material which is placed between the rotation member and the wheel support member and serves to transmit the pivotal displacement about the kingpin axis from the rotation member to the wheel support member, and a pressing means for pressing the elastic material so as to increase a spring constant of the elastic material at least in the pivoting direction about the kingpin axis when the rotation member is rotated by the reference value or more relative to the wheel support member.

* * * * *